United States Patent
Waghmare et al.

(10) Patent No.: US 10,757,166 B2
(45) Date of Patent: Aug. 25, 2020

(54) PASSIVE RE-ASSEMBLY OF HTTP2 FRAGMENTED SEGMENTS

(71) Applicant: INTERNATIONAL BUSINESS MACHINES CORPORATION, Armonk, NY (US)

(72) Inventors: Atul A. Waghmare, Pleasanton, CA (US); Eswar Phani Kondapavuluri, Albany, CA (US); Kanwaldeep S. Bindra, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/195,957

(22) Filed: Nov. 20, 2018

(65) Prior Publication Data

US 2020/0162537 A1     May 21, 2020

(51) Int. Cl.
*H04L 29/08*     (2006.01)
*G06F 16/9532*     (2019.01)
(Continued)

(52) U.S. Cl.
CPC ......... *H04L 67/02* (2013.01); *G06F 16/2255* (2019.01); *G06F 16/9532* (2019.01);
(Continued)

(58) Field of Classification Search
CPC ...... G06Q 10/10; G06Q 10/06; G06Q 10/107; G06Q 30/0201; G06Q 50/18;
(Continued)

(56) References Cited

U.S. PATENT DOCUMENTS

| 6,731,598 B1 * | 5/2004 | Beliveau ......... H04L 29/12009 370/228 |
| 9,773,052 B2 | 9/2017 | Onuska et al. |

(Continued)

FOREIGN PATENT DOCUMENTS

EP     3588896 A1 *     1/2020     ............. H04L 29/06

OTHER PUBLICATIONS

Ilya Grigorik, "High Performance Browser Networking", Sep. 2013, Published by O'Reilly Media, Inc. (Year: 2013).*
(Continued)

*Primary Examiner* — Hitesh Patel
*Assistant Examiner* — Sandarva Khanal
(74) *Attorney, Agent, or Firm* — Teddi E. Maranzano

(57) ABSTRACT

A method, program product, and system for re-assembling fragmented HTTP2 fragments is provided. In response to receiving a SSL/TLS segment, a TCP sequence number hash table is queried for the TCP sequence number included in the SSL/TLS segment header. In response to locating a matching TCP sequence number, extracting from the TCP sequence number hash table an associated stream identifier, and resuming fragmented re-assembly using the associated stream identifier, by extracting the matching HTTP2 stream identifier from a HTTP2 hash table, a HTTP2 buffer and the remaining message length. A new HTTP2 hash table entry is created when a matching entry is not found, indicating start of a new message. For each segment, data from the SSL/TLS segment is appended to the HTTP2 buffer until the complete HTTP2 message is re-assembled. The re-assembled HTTP2 response/request is sent to its destination, and the corresponding entries are deleted from the hash tables.

15 Claims, 6 Drawing Sheets

(51) Int. Cl.
*G06F 16/22* (2019.01)
*H04L 29/06* (2006.01)
*G06Q 30/02* (2012.01)

(52) U.S. Cl.
CPC ......... *H04L 69/16* (2013.01); *G06Q 30/0201* (2013.01); *H04L 63/166* (2013.01)

(58) Field of Classification Search
CPC ... H04L 63/0227; H04L 63/10; H04L 63/166; H04L 67/02; H04L 69/16; G06F 16/21; G06F 16/2255; G06F 16/284; G06F 16/9532; G06F 17/30289; G06F 17/30595
See application file for complete search history.

(56) References Cited

U.S. PATENT DOCUMENTS

| | | | | |
|---|---|---|---|---|
| 2003/0014624 | A1* | 1/2003 | Maturana | H04L 29/06 713/151 |
| 2003/0123447 | A1* | 7/2003 | Smith | H04L 47/10 370/394 |
| 2006/0104303 | A1* | 5/2006 | Makineni | H04L 69/166 370/463 |
| 2009/0254572 | A1 | 10/2009 | Redlich et al. | |
| 2015/0349930 | A1* | 12/2015 | Sazawa | H04L 43/062 370/254 |
| 2017/0346725 | A1* | 11/2017 | Lapidous | B41F 31/36 |

OTHER PUBLICATIONS

Ilya Grigorik et al., "Introduction to HTTP/2": an excerpt from High Performance Browser Networking by O'Reilly, Google Developers, 2019 (Year: 2019).*

Fielding, et al., "RFC 2616-HTTP/1.1", Jun. 1999, The Internet Society (1999). (Year: 1999).*

Belshe, et al., "RFC 7540-HTTP/2", May 2015, IETF community (Year: 2015).*

Gilbert et al., . "An approach towards anomaly based detection and profiling covert TCP/IP channels", 7th International Conference on Information, Communications and Signal Processing (ICICS), Dec. 8-10, 2009, 5 pages.

Kumar, "Review on network security and cryptography", International Transaction of Electrical and Computer Engineers System, 2015, vol. 3, No. 1, pp. 1-11, Science and Education Publishing.

Peuhkuri, "Application and TCP measurements", Apr. 4, 2007, 15 pages.

Serral-Garcia et al., "Active measurement tool for the EuQoS Project", 3rd International Workshop on Internet Performance, Simulation, Monitoring and Measurements (IPS-MoMe), Mar. 2005, 9 pages.

Slaviero et al., "Active traffic capture for network forensics", International Federation for Information Processing, 2006, pp. 215-228, vol. 222, Advances in Digital Forensics II.

* cited by examiner

PASSIVE RE-ASSEMBLY OF HTTP2 FRAGMENTED SEGMENTS

BACKGROUND

The present invention relates generally to programmable computer systems, and more specifically to computer-implemented methods, computer systems and computer program products configured to passively re-assemble HTTP2 fragmented segments.

In the HTTP2 protocol, stream identifier identifies/defines the start and end of the stream over a particular connection. The HTTP2 stream may become fragmented at the session security level, for example, when the request/response exceeds the allowable segment size. In this case, the first segment of fragmentation contains the stream identifier, but subsequent segments are transmitted without stream identifier. This makes re-assembling segment fragments in a passive application difficult.

SUMMARY

A computer-implemented-method of re-assembling fragmented HTTP2 segments is provided. In response to receiving a SSL/TLS segment, querying for a TCP sequence number from a TCP sequence number hash table. In response to locating a matching TCP sequence number in the TCP sequence number hash table, extracting from the TCP sequence number hash table an associated stream identifier. Fragmented re-assembly is resumed using the associated stream identifier.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

Figure 1:
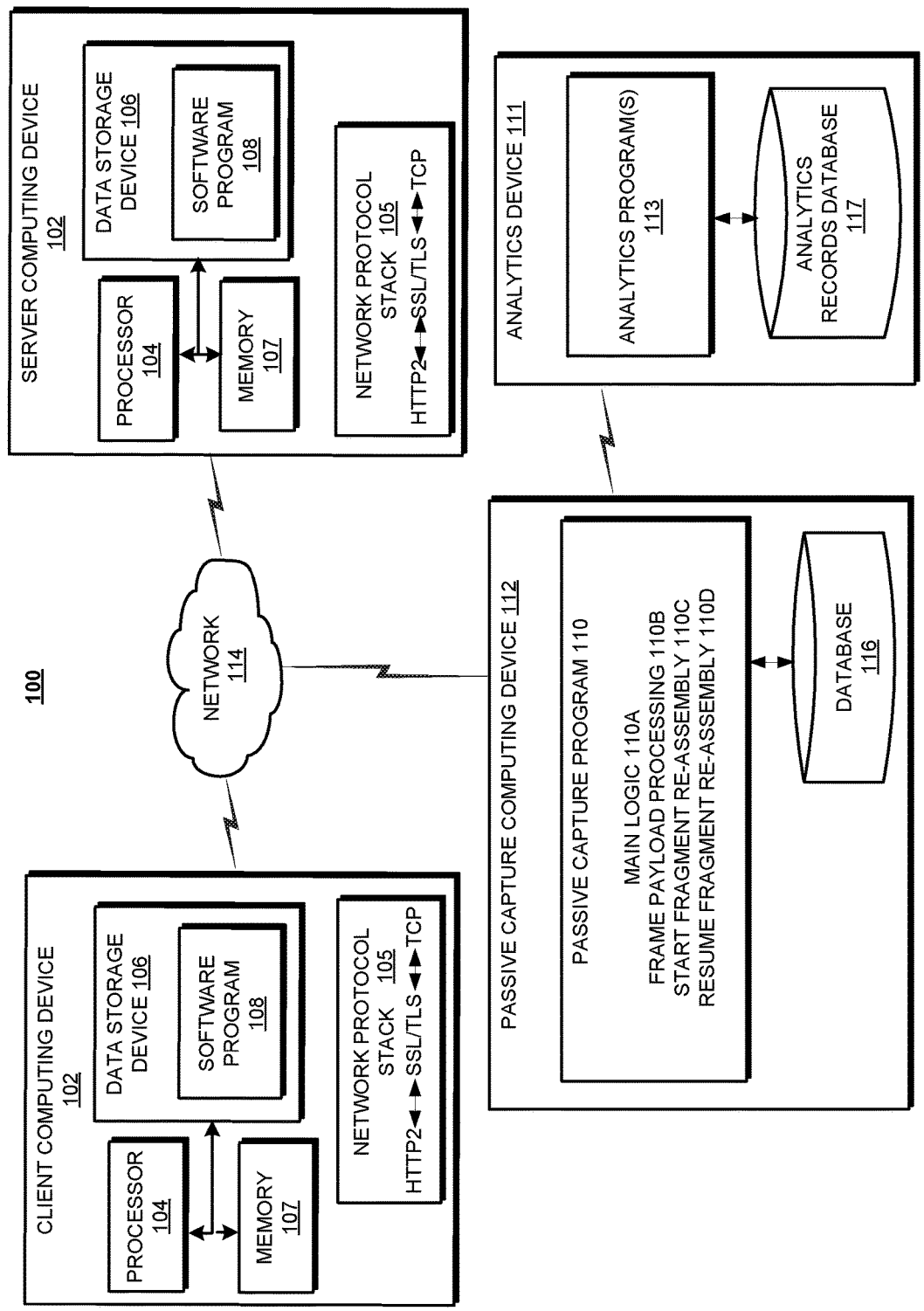
FIG. 1 is a block diagram of a system embodying aspects of the invention.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview description of technologies that are more specifically related to aspects of the invention, passive data capture refers to gathering of consumer data for analytics purposes, through the behavior and interaction of users with business entities and with other users. The passive capture technique includes duplicating data (e.g., web traffic) of a transaction that is communicated over a network (e.g., the internet) between a client and a server. The passive data capture does not involve a server to perform the process of duplicating the data, thereby not impacting the server performance. In this regard, the server sending or receiving the data over the network does not provide information for use in duplicating the data to the system or device performing a passive capture technique. Instead, the data is merely routed through the passive capture system or device, which autonomously duplicates the data. Once duplicated, the data can be communicated to another server. Analysis of the passively captured data can provide insights that impact business decisions. For example, on a mobile device, a data capture application may provide insight on which apps the customer has installed and regularly uses, and which products the user purchases, or which movies the user prefers. Similarly, GPS and a map application may indicate that the user is a frequent traveler who may receive targeted hotel advertising.

Passive data capture also refers to non-consumer based business activities that are important to the efficient operation of the business enterprise. In this case, the client device can include tablets, laptops and desktop computers, in addition to mobile devices. Here, the passive capture application may be installed on a separate device that is dedicated to the purpose of intercepting network traffic flowing between two or more computing devices. As a security safeguard, monitoring passively captured network traffic can reveal accesses to restricted websites or other non-secure entities that may cause malware to be introduced in the network. In the security context, such monitoring also can detect proprietary data, such as personal data or intellectual property, being illegally transferred out of the business enterprise. Subsequently, the business enterprise's network administrator can block these non-secure entities from entering the network. Additionally, analysis of the passively captured network traffic can reveal trends in performance metrics and bandwidth utilization that can be input to the capital spending plan for future hardware and software purchases. Finally, passive data capture is a common technique for performing root cause analysis. This is especially the case when the problem is difficult to diagnose or occurs randomly. Data captured in real-time at the point of failure can be analyzed to show actual values being passed between computing devices, thus potentially identifying which application caused the failure.

Turning now to an overview description of technologies that are more specifically related to aspects of the invention, embodiments of the invention are directed to computer-implemented methods, computer systems and computer program products configured and arranged to passively re-assemble HTTP2 fragmented segments.

A client computing device and a server computing device communicate over a network using the TCP/IP protocol, which is included as a network component of the server. The network component can be implemented in the server's operating system, in computing hardware, such as network switches, or both. When the client and server communicate using a web-based application, the network component also includes the HTTP2 protocol, which manages the exchanging of request and response messaging between the client and server on the World Wide Web (Internet). The TLS (Transport Layer Security) layer, the successor to SSL (Secure Sockets Layer), is the standard technology for keeping an internet connection secure. SSL/TLS encrypts message segments received from the HTTP2 layer before sending the message segments to the TCP layer for transmission across the network. Similarly, SSL/TLS decrypts message segments received from the TCP layer, and then delivers the decrypted message segments to the HTTP2 layer for rendering in the browser. Rendering can be thought of as receiving and executing the files requested by the client web-based application, for example, by clicking on a URL. The requested files can include HTML, style sheets, and script files.

After processing the data included in its message segment, each communication layer encapsulates its message segment with a header before passing the message segment to the next layer. The contents of the header are defined by the architectural specification governing that layer. For example, the TCP/IP header includes a TCP sequence number which is used to ensure the proper order of the message fragments when a message spans multiple message segments. The TCP/IP header also includes, among other fields, a length of the message in bytes. The SSL/TLS header includes, among other fields, a record type that identifies the message as a SSL/TLS record, and a length of data included in the message segment. Finally, the header of the HTTP2 frame includes a length of the data in the frame, and a stream identifier, among other fields. It should be noted that in HTTP2, the stream identifier is in the header of each HTTP2 frame. However, the HTTP2 frame can be fragmented into multiple SSL/TLS segments during encryption. In this case, only the first segment contains the HTTP2 frame's header information, containing the stream identifier.

TCP/IP, SSL/TLS, and HTTP2 are each independent layers. The network component includes logic to properly recognize a packet as a TCP/IP message packet, extract the message information, and then transfer the extracted message information to the next destination. For example, an inbound message, i.e., one that is received from the network and destined for a user on the receiving computer, has its TCP header removed. The resulting message segment is formatted for the SSL/TLS layer, and is transmitted to the SSL/TLS layer for decrypting. The decrypting is performed using a private/public key that was exchanged when the connection was initiated between the client and the server. The SSL/TLS layer subsequently transmits the decrypted message segment to the HTTP2 layer where the message is formatted and rendered. For outbound messages, i.e., messages destined for another computer on the network, the process is reversed.

The network component ensures that message segments are transmitted between a web-based client and a web-based server in the correct order, and without dropping any of the message. The architecture of each layer specifies that the message segments be of a uniform specific size. If a message exceeds a layer's architected size, that layer must create a number of message segment fragments sufficient to contain the entire message segment. Additionally, the headers of the message segment fragments include fields and flags to enable the network component to re-assemble the message segment fragments in the correct order and without dropping any of the message. For example, each TCP/IP header includes a TCP sequence number, and the HTTP2 header includes a stream identifier, but only in the first segment of the request message. Message segment fragmentation can easily happen when the message transmits several style sheets and other files that the browser requests and receives in order to build and render the response in the web-based application. It should be noted that the TCP/IP, SSL/TLS, and HTTP2 layers each may fragment their message segments as necessary.

As will be discussed further with reference to FIG. 1, the passive data capture application is interposed between the web-based client and the web-based server where it intercepts network packets transmitted between them. Some of these network packets may include request/response message segments and message segment fragments that are being exchanged between one or more web-based clients and one or more web-based servers. In the HTTP2 protocol, the bi-directional exchange of frames between a web-based client and a web-based server over a TCP/IP connection is referred to as a stream. The HTTP2 protocol allows multiple streams to be interleaved over the same connection. In this context, a stream includes one or more request/response messages. Each request/response message is comprised of one or more frames.

The stream identifier in the HTTP2 header identifies the start of the stream over a particular connection. As discussed previously, the HTTP2 stream may become fragmented at the session security level, for example, when the request/response exceeds the allowable message segment size. In this case, the header of the first message fragment of the fragmented message segment contains the stream identifier, but subsequent segment fragments are not.

When a full request and a full response are small enough to be received in a single decrypted HTTP2 segment, they can be paired by stream identifier. However, when a request/response is broken into segments by the SSL/TLS layer or the TCP/IP layer, it is not possible for the passive data capture application to reliably re-assemble the HTTP2 messages. This is because, while the network component includes the logic to correctly re-assemble multiple message packets, the passive capture application does not. In current practice, re-assembling fragmented HTTP2 segments typically includes examining the captured data and attempting to identify the type of file each record belongs to, and subsequently, which request/response stream. This makes re-assembling segment fragments in a passive application difficult.

Turning now to a more detailed description of aspects of the invention, FIG. 1 is a block diagram of a system embodying aspects of the invention.

The system 100 includes a client computing device (client) 102 configured to communicate over a network 114 with a server computing device (server) 102. The client 102 includes a memory 107, one or more software program 108, that include user applications and an operating system, embodied on a data storage device 106. The one or more software program 108 are loaded into the memory 107 for execution by a processor 104. The software program 108 includes a web-enabled client application that communicates with a web-enabled server application on the server 102 over the network 114. In this case, the network 114 includes the World Wide Web (Internet). The web-enabled client application and web-enabled server application communicate over the Internet using the HTTP2 protocol. As shown, the HTTP2 protocol is a portion of the network protocol stack 105 that is specialized for Internet communications.

System 100 also includes the passive capture computing device 112. The passive capture computing device 112 is interposed between the client 102 and the server 102 where it intercepts network packets transmitted between them. The passive capture computing device 112 includes a passive capture program 110 connected to the network 114, and having program instructions to capture network traffic transmitted between the client 102 and server 102. The passive capture program 110 creates and maintains hash tables by TCP sequence number and HTTP2 stream identifier. The passive capture program 110 uses the hash tables to to re-assemble the multiple message packets into the error-free message, as originally transmitted. In order for the passive capture program 110 to copy data from the server 102, the passive capture program 110 is configured with the keys from the server 102 so that the session between the client 102 and the server 102 can be decrypted.

The captured network traffic is stored in database 116 for later analysis, either by the passive capture program 110 or by another application, such as those on analytics device 111. The analysis may include determining performance metrics, bandwidth utilization, problem determination diagnostics, and security monitoring. In this context, a database refers to a means of storing information in such a way that data can be retrieved from it. This includes data stored in files, and data organized in a relational, in-memory, or hierarchical database.

The various components/modules of the system 100 are depicted for ease of illustration and explanation. In embodiments of the invention, the client 102A and server 102B may be any computing devices capable of executing web-based applications over the Internet. Similarly, the passive capture computing device 112 may be any computing device in a configuration capable of executing the instructions of the passive capture program 110.

In an embodiment of the invention, the illustrated components of the passive capture program 110 can be implemented as one or more modules. For example, the passive capture program 110 may be implemented as a main logic module 110A, frame payload processing module 110B, a module to start fragment re-assembly 110C, and a module to resume fragment re-assembly 110D. Additionally, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, form the module and achieve the stated purpose for the module.

Figure 2:
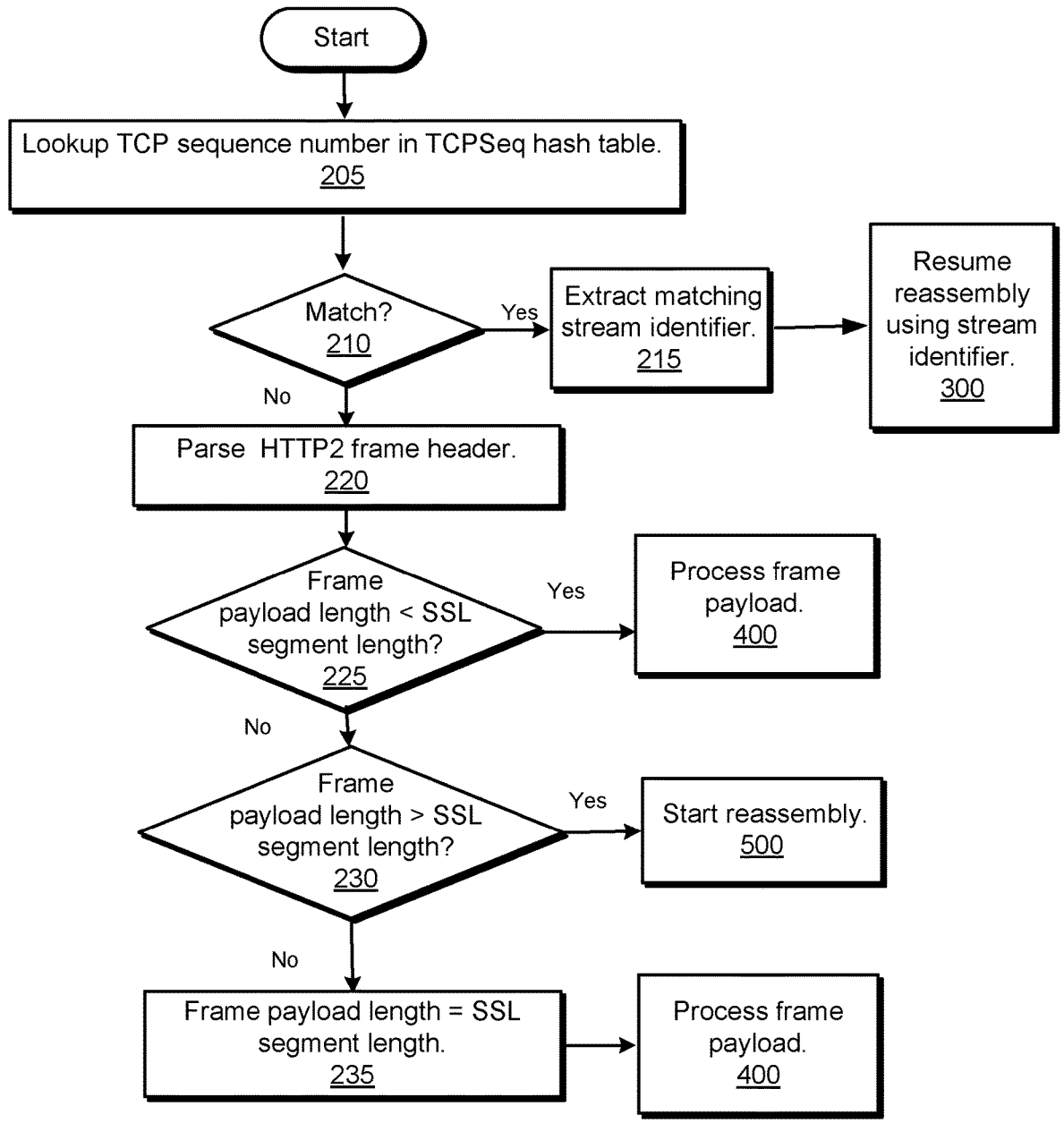
FIG. 2 is a flow diagram illustrating embodying aspects of the invention.

FIG. 2 is a flow diagram illustrating the main re-assembly of HTTP2 fragmented segments according to embodiments of the present invention. At initialization, the passive capture program 110 identifies the TCP handshake sequence that identifies the start of a new TCP/IP connection. As part of its initialization, the passive capture program 110 allocates a TCPSeq hash table and a HTTP2 hash table that are stored in memory. The TCPSeq hash table is indexed by the TCP sequence number from the TCP/IP header. This hash table includes the stream identifier from the header of the first HTTP2 segment, and the remaining length (in bytes) expected for that stream identifier. A separate new TCPSeq hash table is created for each HTTP2 connection. Each TCPSeq hash table contains entries associated with the multiple streams within the connection. The TCPSeq hash table is modified as streams are created, deleted, and updated. The multiple TCPSeq hash tables are kept in memory.

The HTTP2 hash table is indexed by stream identifier, and contains a pointer to an Object associated with the stream identifier. The Object includes a buffer address to a buffer containing the HTTP2 request/response, depending on the type of fragment being re-assembled, and a remaining length expected for the stream identifier. The request and the response each have a separate buffer.

For each SSL/TLS segment intercepted by the passive data capture computing device 112, at 205 the passive capture program 110 extracts the TCP sequence number from the TCP/IP header, and queries the TCPSeq hash table. At 210, if the TCP sequence number is found in the TCPSeq hash table, then at 215 extract the associated stream identifier from the TCPSeq hash table. Locating the TCP sequence number in the TCPSeq hash table indicates that this SSL/TLS segment is part of a HTTP2 message already being re-assembled. Processing to resume re-assembling the HTTP2 message fragment continues at 300, further detailed in FIG. 3 below.

If a matching TCP sequence number is not located in the TCPSeq hash table, this indicates a new stream and the beginning of a new HTTP2 message. Therefore, at 220 the passive capture program 110 parses the HTTP2 frame header and extracts the stream identifier, frame type, frame payload length, and frame flags. A new entry is created in the TCPSeq hash table, indexed by the TCP sequence number. Since this is a new stream, the HTTP2 frame is the first frame in the message, and will have the stream identifier in the header.

If at 225 the frame payload length is less than the SSL/TLS segment length, processing the HTTP2 message, i.e., the passive capture program 110 uses the frame payload data to continue processing the frame payload at 400, further detailed in FIG. 4 below. The frame payload data is the data portion of the frame, i.e., the frame minus the header information. The frame payload length is the length of the frame payload data.

The frame payload length may still be either greater than or equal to the SSL/TLS segment length. Each of these conditions is processed differently, depending on the results of the comparison made at 230. If the frame payload length is greater than the SSL/TLS segment length, then the passive capture program 110 identifies the HTTP2 message as being fragmented because the size of the HTTP2 message is greater than that which can be encrypted within the limits of one SSL/TLS segment. The processing continues at 500 to start fragmented re-assembly, further detailed in FIG. 500 below.

If, at 235, the frame payload length is equal to the SSL/TLS segment length, the passive data capture program uses the frame payload data, and continues processing at 400, further detailed in FIG. 4 below.

Figure 3:
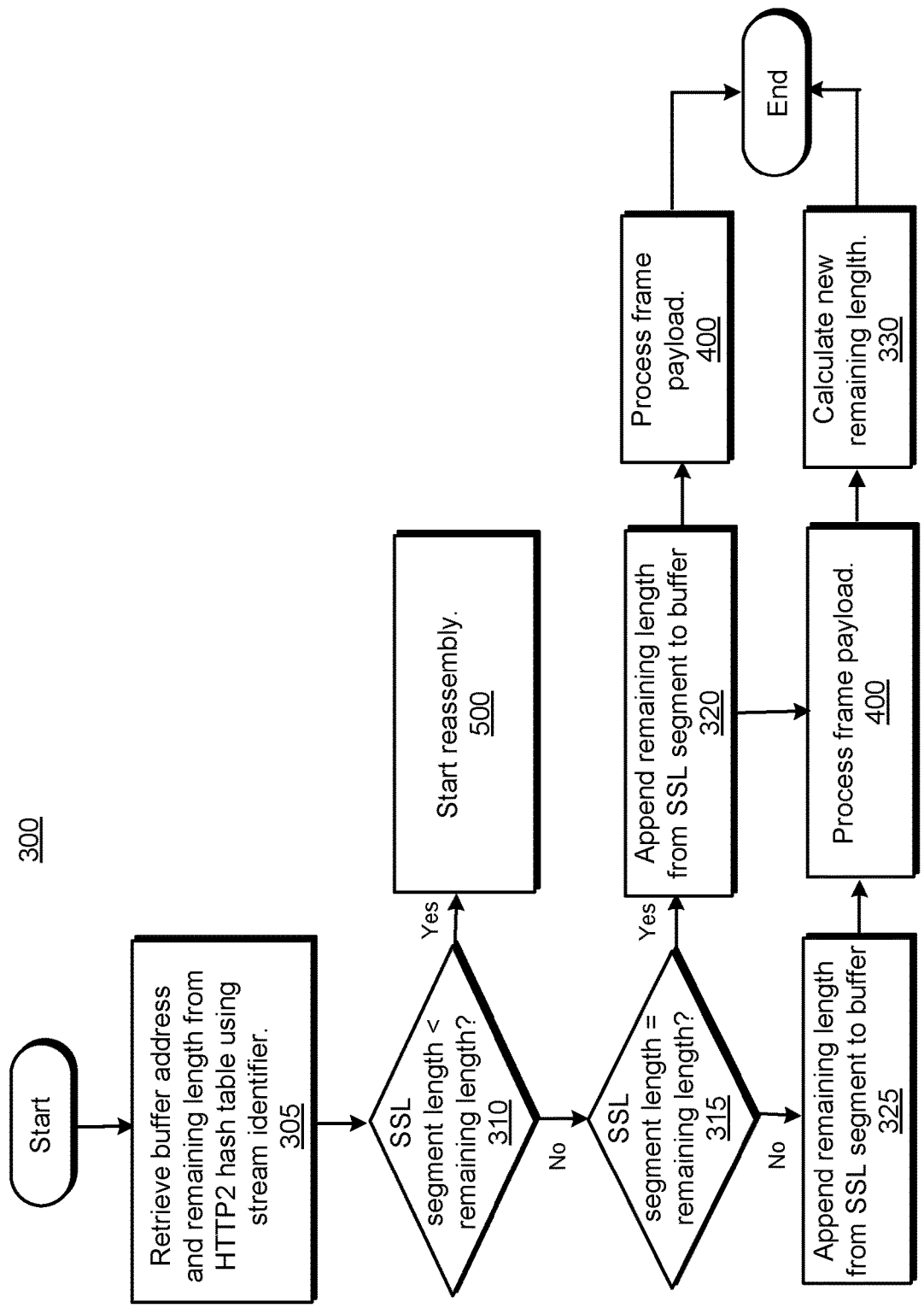
FIG. 3 is a flow diagram illustrating resuming fragment re-assembly.

FIG. 3 illustrates an example flow diagram 300 for resuming fragment re-assembly, according to embodiments of the present invention. Processing continues here from step 215 of FIG. 2.

At 305, the passive capture program 110 uses the stream identifier retrieved from the TCPSeq hash table at 215 of FIG. 2. This stream identifier is used to locate the matching stream identifier in the HTTP2 hash table. The address of the Object that is associated with the matching stream identifier is extracted.

At 310, if the SSL/TLS segment length is less than the remaining length that is stored in the Object, then the processing continues at 500 to start fragmented re-assembly, further detailed in FIG. 500 below.

However, the SSL/TLS segment length may still be equal to or greater than the remaining length that is stored in the Object. Each of these conditions is processed similarly, as a result of the comparison made at 315. If the SSL/TLS segment length is equal to the remaining length that is stored in the Object, then at 320 the passive capture program 110 appends the remaining length of data from the SSL/TLS segment to the buffer using the pointer address from the Object. The passive capture program 110 uses the buffer as the frame payload data to continue processing the frame payload at 400, further detailed in FIG. 4 below. Similarly, if the SSL/TLS segment length is greater than the remaining length that is stored in the Object, then at 325 the passive capture program 110 appends the remaining length of data from the SSL/TLS segment to the buffer using the pointer address from the Object. The passive capture program 110 uses the buffer as the frame payload data to continue processing the frame payload at 400, further detailed in FIG. 4 next.

Figure 4:
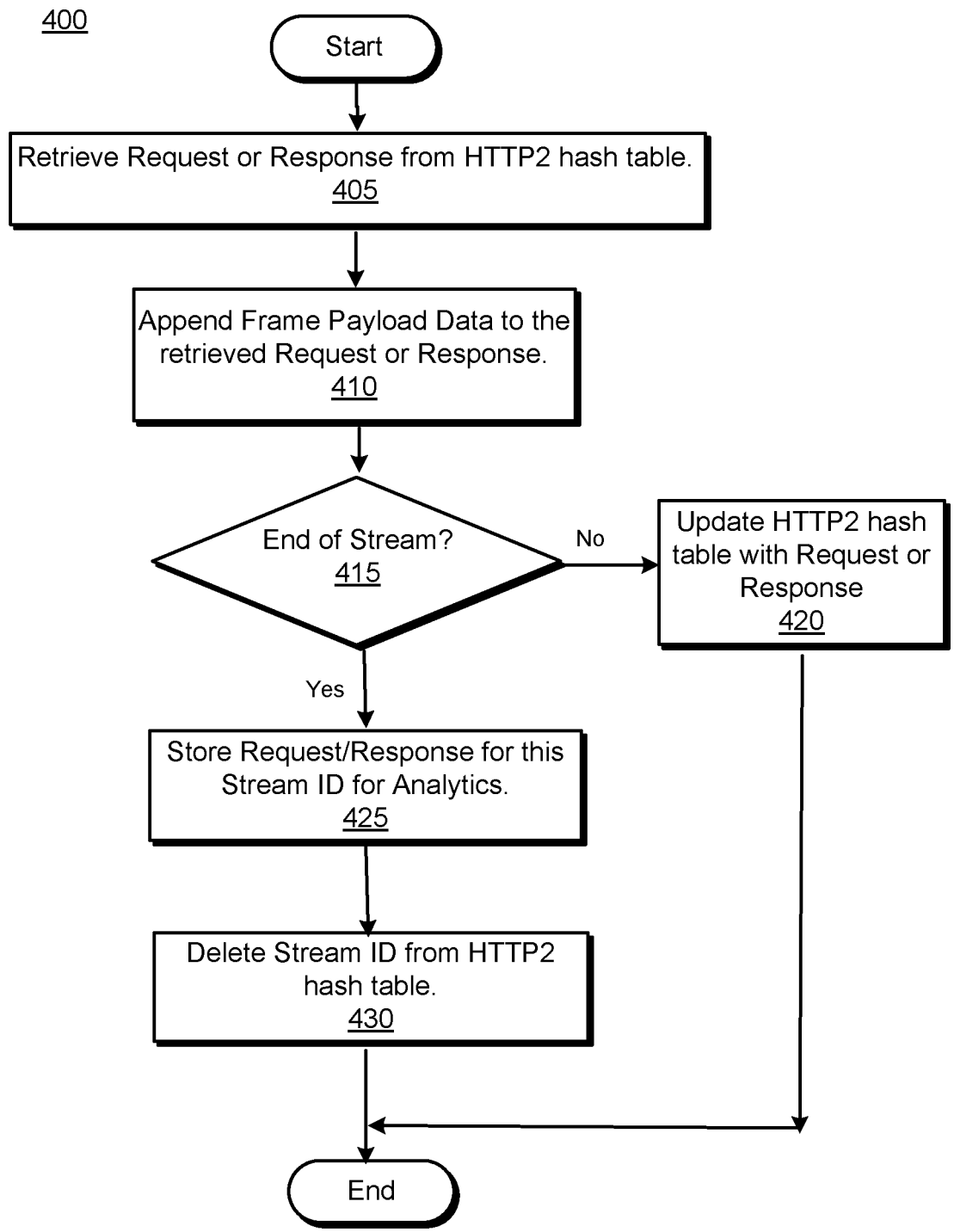
FIG. 4 is a flow diagram illustrating processing a frame payload.

FIG. 4 is a flow diagram 400 illustrating processing frame payload according to embodiments of the present invention. In general, the passive capture program 110 invokes the processing of FIG. 4 to append the frame payload data to the buffer. When the SSL/TLS segment length is less than or is equal to the remaining length that is stored in the Object, the passive capture program appends the remaining length of data from the SSL/TLS segment to the buffer. When the SSL/TLS segment length is greater than the remaining length that is stored in the Object, then after appending the frame payload data to the buffer, the passive capture program calculates a new SSL/TLS segment length as the SSL/TLS segment length minus the remaining length from the Object.

At 405, the passive capture program uses the stream identifier from the HTTP2 hash table to retrieve the pointer to the Object from the HTTP2 hash table, and extract the buffer address. The buffer includes the HTTP2 fragmented segments, as they are being re-assembled, for either the browser request or the response to the browser request, depending on the type of message being re-assembled. If this is the start of a new stream, the HTTP2 hash table will not yet have an entry corresponding to the stream identifier from the TCPSeq hash table. Therefore, a new entry is created for the stream identifier, including a pointer to a new Object. At 410, the passive capture program 110 appends the frame payload data to the buffer, which is pointed to by the address in the Object. The passive capture program 110 checks the flags in the SSL/TLS header for an indication that this is the end of stream. If at 415, this is the end of the stream, then the passive capture program 110 stores the completed request/response buffer for further analytics, at 425. The entry for this stream identifier can be deleted from the HTTP2 hash table at 430. However, if the end of the stream is not indicated in the SSL/TLS header, then at 420, the passive capture program 110 updates the HTTP2 hash table with the partially assembled request/response buffer.

Alternatively, the completed request/response buffer may be passed to analytics device 111 for real-time analysis, asynchronously, while the passive capture program 110 re-assembles HTTP2 fragmented segments. In this embodiment, one or more analytics programs 113, such as network performance, capacity measurement, and network security, may simultaneously access the completed request/response buffer and execute the desired analyses in parallel. The resulting analyses may then be stored for future examination, for example in analytics records database 117, and the original completed request/response buffer may be stored separately, for example in database 116, where it can be available as input to further analysis in the future.

Figure 5:
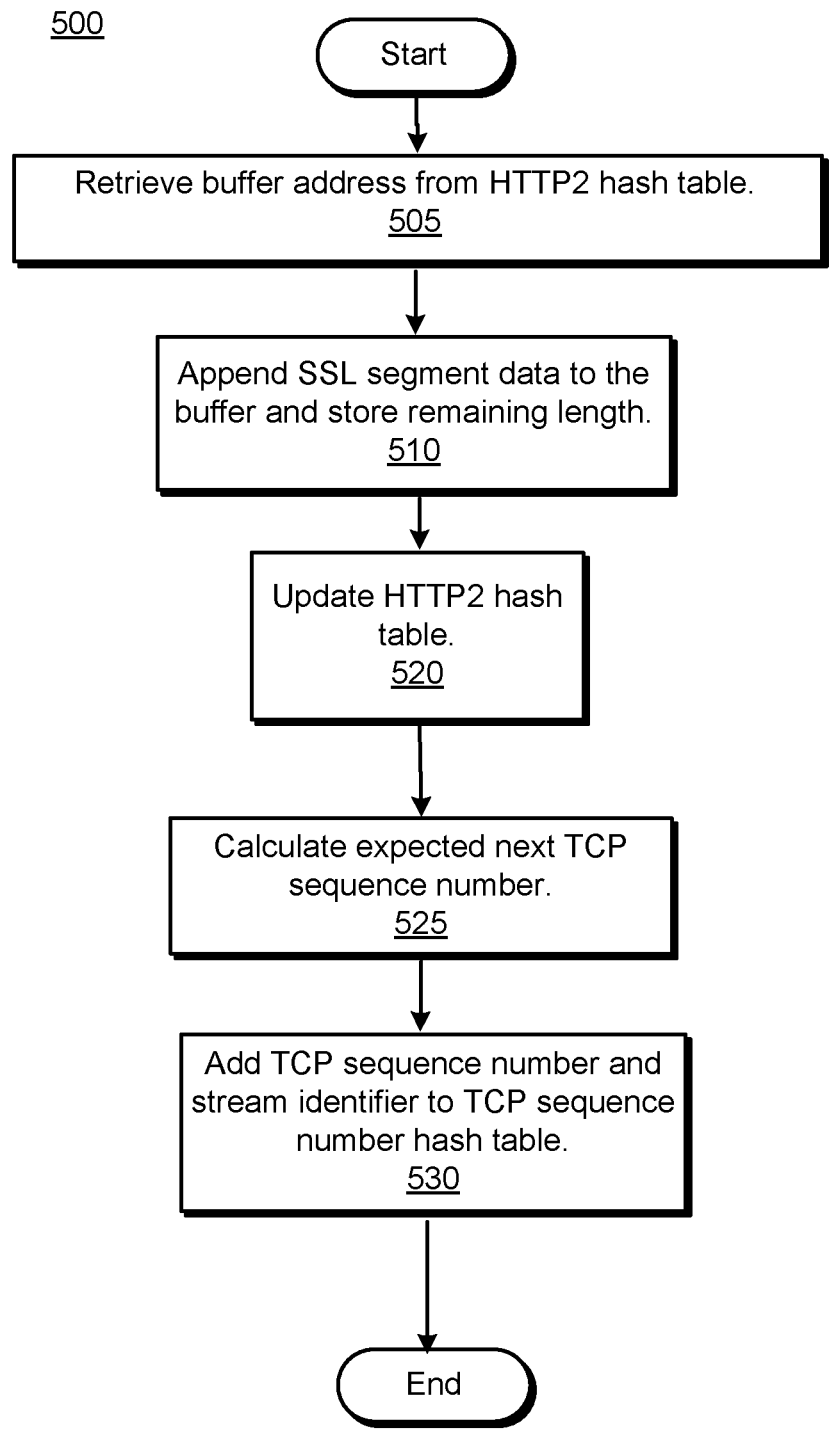
FIG. 5 is a flow diagram illustrating fragment re-assembly.

FIG. 5 is a flow diagram 500 illustrating starting fragment re-assembly, according to embodiments of the present invention. In general, the passive capture program 110 invokes the processing of FIG. 5 from step 230 of FIG. 2, when the passive capture program 110 receives a SSL/TLS segment and the TCP sequence number is not found in the TCPSeq hash table. The passive capture program 110 also invokes the processing of FIG. 5 from step 310 of FIG. 3, when a matching TCP sequence number is found in the TCPSeq hash table, indicating this is another fragment of a previously identified SSL/TLS segment.

At 505, the passive capture program 110 uses the stream identifier to retrieve the pointer to the Object from the HTTP2 hash table. If the stream identifier is not found in the HTTP2 hash table, the passive capture program 110 recognizes this stream identifier as the start of a new stream, and creates a new entry for it in the HTTP2 hash table. At 510, the SSL/TLS segment data is appended to the request/response buffer in the Object. The passive capture program 110 calculates remaining length as SSL/TLS frame payload length minus SSL/TLS segment length, and at 520 stores the remaining length in the Object, as well. At 525, the passive capture program 110 calculates the expected next TCP sequence number, using the TCP sequence number of the last SSL/TLS segment and the TCP packet length. This calculated next TCP sequence number is added as an entry to the TCPSeq hash table, at 530, along with the stream identifier associated with this TCP sequence number.

Figure 6:
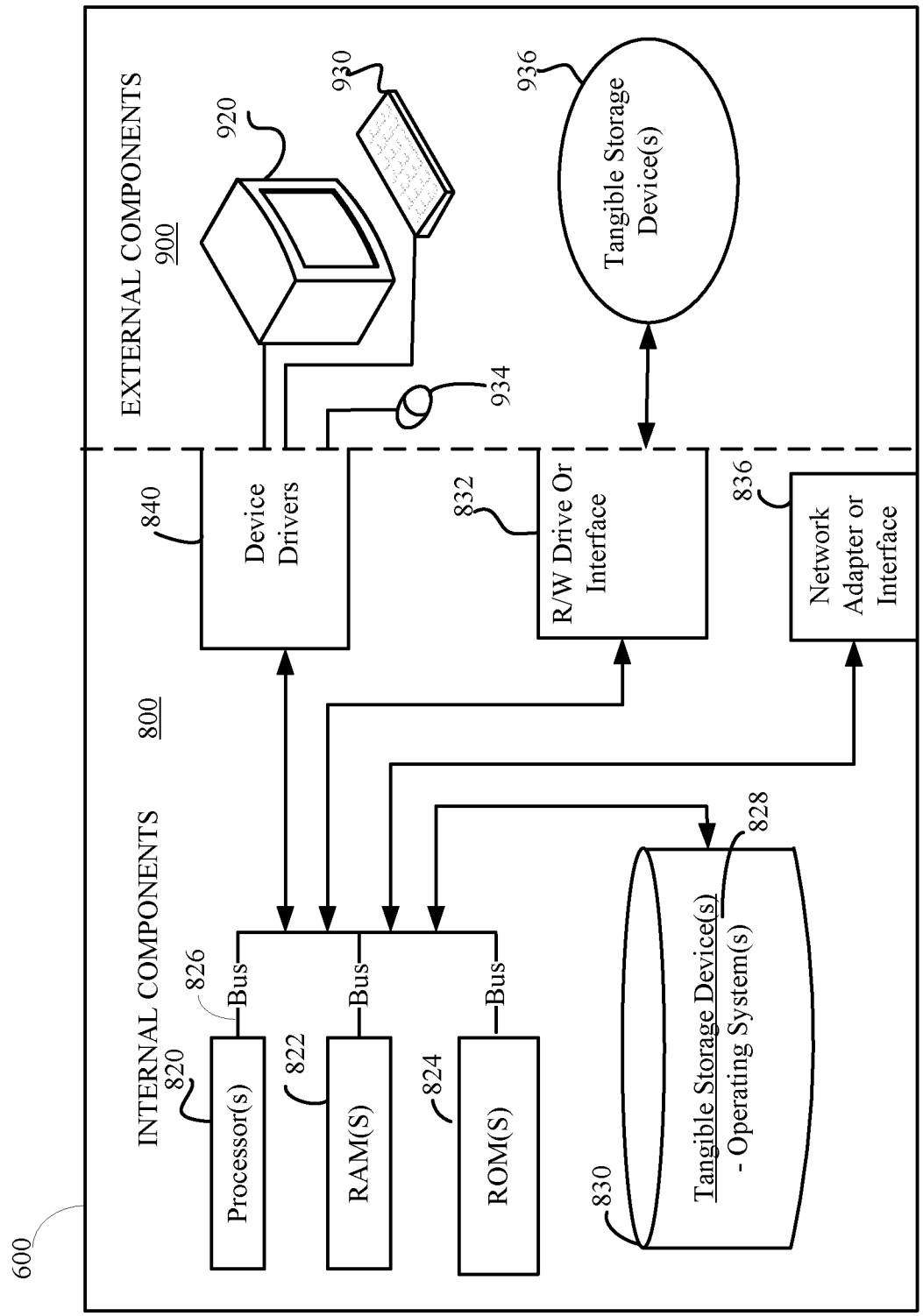
FIG. 6 is a schematic block diagram of hardware and software of the computer environment according to an embodiment of the processes of FIGS. 2-5.

Referring now to FIG. 6, computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 2-5; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or both, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented-method of re-assembling fragmented Hypertext Transfer Protocol Version 2 (HTTP2) segments, the computer-implemented method comprising:

in response to receiving a Secure Sockets Layer/Transport Layer Security (SSL/TLS) segment, querying for a Transmission Control Protocol (TCP) sequence number from a TCP sequence number hash table, wherein the TCP sequence number hash table comprises the TCP sequence number and an associated stream identifier, wherein the associated stream identifier identifies a first HTTP2 message segment, and wherein the TCP sequence number hash table is indexed by the TCP sequence number;

in response to locating a matching TCP sequence number in the TCP sequence number hash table, extracting from the TCP sequence number hash table the associated stream identifier;

using the associated stream identifier, extracting a HTTP2 stream identifier from a HTTP2 hash table, wherein the HTTP2 stream identifier matches the associated stream identifier;

extracting from the HTTP2 hash table a HTTP2 buffer and a HTTP2 remaining length, wherein the HTTP2 buffer and the HTTP2 remaining length are associated with the HTTP2 stream identifier;

based on a SSL/TLS segment length being less than the HTTP2 remaining length, starting fragmented re-assembly; and based on the SSL/TLS segment length being equal to the HTTP2 remaining length or greater than the HTTP2 remaining length, appending a SSL/TLS remaining length of data from the SSL/TLS segment to the HTTP2 buffer, and processing a frame payload using the HTTP2 buffer.

2. The computer-implemented method of claim 1, wherein starting fragment re-assembly further comprises:
- appending the SSL/TLS remaining length of data to the HTTP2 buffer;
- calculating the HTTP2 remaining length as a SSL/TLS frame payload length minus the SSL/TLS segment length;
- updating the HTTP2 hash table for the HTTP2 stream identifier with the HTTP2 remaining length and a pointer to the HTTP2 buffer; and
- updating a TCP sequence hash table with a calculated expected next TCP sequence number and the associated stream identifier.

3. The computer-implemented method of claim 1, wherein processing frame payload further comprises:
- appending the SSL/TLS remaining length of data from the SSL/TLS segment to a HTTP2 request or a HTTP2 response, based on a type of message; and
- in response to the SSL/TLS segment including an indication of end of stream, delivering the HTTP2 request and the HTTP2 response, and deleting an entry corresponding to the HTTP2 stream identifier from the HTTP2 hash table.

4. The computer-implemented method of claim 1, wherein the HTTP2 hash table includes the HTTP2 stream identifier, and a pointer to an object, wherein the object includes a pointer to a HTTP2 response, a pointer to a HTTP2 request, and a pointer to the HTTP2 buffer.

5. The computer-implemented method of claim 4, wherein the HTTP2 hash table is indexed by the HTTP2 stream identifier, and wherein the HTTP2 stream identifier is included in a header of a first HTTP2 message segment.

6. The computer-implemented method of claim 1, wherein a new HTTP2 stream identifier entry is created in the HTTP2 hash table, based on the associated stream identifier not matching the HTTP2 stream identifier in the HTTP2 hash table, and wherein the HTTP2 stream identifier identifies a new HTTP message.

7. A computer system of re-assembling fragmented Hypertext Transfer Protocol Version 2 (HTTP2) fragments comprising one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
- in response to receiving a Secure Sockets Layer/Transport Layer Security (SSL/TLS) segment, querying for a Transmission Control Protocol (TCP) sequence number from a TCP sequence number hash table, wherein the TCP sequence number hash table comprises the TCP sequence number and an associated stream identifier, wherein the associated stream identifier identifies a first HTTP2 message segment, and wherein the TCP sequence number hash table is indexed by the TCP sequence number;
- in response to locating a matching TCP sequence number in the TCP sequence number hash table, extracting from the TCP sequence number hash table an associated stream identifier;
- using the associated stream identifier, extracting a HTTP2 stream identifier from a HTTP2 hash table, wherein the HTTP2 stream identifier matches the associated stream identifier;
- extracting from the HTTP2 hash table a HTTP2 buffer and a HTTP2 remaining length, wherein the HTTP2 buffer and the HTTP2 remaining length are associated with the HTTP2 stream identifier;
- based on a SSL/TLS segment length being less than the HTTP2 remaining length, starting fragmented re-assembly; and
- based on the SSL/TLS segment length being equal to the HTTP2 remaining length or greater than the HTTP2 remaining length, appending a SSL/TLS remaining length of data from the SSL/TLS segment to the HTTP2 buffer, and processing frame payload using the HTTP2 buffer.

8. The computer system of claim 7, wherein starting fragment re-assembly further comprises:
- appending the SSL/TLS remaining length of data to the HTTP2 buffer;
- calculating the HTTP2 remaining length as a SSL/TLS frame payload length minus the SSL/TLS segment length;
- updating the HTTP2 hash table for the HTTP2 stream identifier with the HTTP2 remaining length and a pointer to the HTTP2 buffer; and
- updating a TCP sequence hash table with a calculated expected next TCP sequence number and the associated stream identifier.

9. The computer system of claim 7, wherein processing frame payload further comprises:
- appending the SSL/TLS remaining length of data from the SSL/TLS segment to a HTTP2 request or a HTTP2 response, based on a type of message; and
- in response to the SSL/TLS segment including an indication of end of stream, delivering the HTTP2 request and the HTTP2 response, and deleting an entry corresponding to the HTTP2 stream identifier from the HTTP2 hash table.

10. The computer system of claim 7, wherein the HTTP2 hash table includes the HTTP2 stream identifier, and a pointer to an object, wherein the object includes a pointer to a HTTP2 response, a pointer to a HTTP2 request, and a pointer to a HTTP2 buffer.

11. The computer system of claim 7, wherein the HTTP2 hash table is indexed by the HTTP2 stream identifier, and wherein the HTTP2 stream identifier is included in a header of a first HTTP2 message segment.

12. A computer program product comprising a computer readable storage medium having program instructions embodied therewith, the program instructions executable by a processor of a computing device to cause the processor to perform operations comprising:
- in response to receiving a Secure Sockets Layer/Transport Layer Security (SSL/TLS) segment, querying for a Transmission Control Protocol (TCP) sequence number from a TCP sequence number hash table, wherein the TCP sequence number hash table comprises the TCP sequence number and the associated stream identifier, wherein the associated stream identifier identifies a first Hypertext Transfer Protocol Version 2 (HTTP2) message segment, and wherein the TCP sequence number hash table is indexed by the TCP sequence number;
- in response to locating a matching TCP sequence number in the TCP sequence number hash table, extracting from the TCP sequence number hash table the associated stream identifier;

using the associated stream identifier, extracting the (HTTP2) stream identifier from a HTTP2 hash table, wherein the HTTP2 stream identifier matches the associated stream identifier;

extracting from the HTTP2 hash table a HTTP2 buffer and a HTTP2 remaining length, wherein the HTTP2 buffer and the HTTP2 remaining length are associated with the HTTP2 stream identifier;

based on a SSL/TLS segment length being less than the HTTP2 remaining length, starting fragmented re-assembly; and based on the SSL/TLS segment length being equal to the HTTP2 remaining length or greater than the HTTP2 remaining length, appending a SSL/TLS remaining length of data from the SSL/TLS segment to the HTTP2 buffer, and processing frame payload using the HTTP2 buffer.

13. The computer program product of claim 12, wherein starting fragment re-assembly further comprises:

appending the SSL/TLS remaining length of data to the HTTP2 buffer;

calculating the HTTP2 remaining length as a SSL/TLS frame payload length minus the SSL/TLS segment length;

updating the HTTP2 hash table for the HTTP2 stream identifier with the HTTP2 remaining length and a pointer to the HTTP2 buffer; and updating a TCP sequence hash table with a calculated expected next TCP sequence number and the associated stream identifier.

14. The computer program product of claim 12, wherein the HTTP2 hash table is indexed by the HTTP2 stream identifier, and wherein the HTTP2 stream identifier is included in a header of a first HTTP2 message segment.

15. The computer program product of claim 12, wherein the HTTP2 hash table includes the HTTP2 stream identifier, and a pointer to an object, wherein the object includes a pointer to a HTTP2 response, a pointer to a HTTP2 request, and a pointer to a HTTP2 buffer.

* * * * *